(No Model.)

L. C. & B. BOSLEY.
PRUNING KNIFE.

No. 531,358. Patented Dec. 25, 1894.

Witnesses
W. Schneider
W. S. Duvall

Inventors
Lewis C. Bosley and
Benjamin Bosley
By their Attorneys,
C. A. Snow & Co.

UNITED STATES PATENT OFFICE.

LEWIS CALVIN BOSLEY AND BENJAMIN BOSLEY, OF SPICKARD, MISSOURI.

PRUNING-KNIFE.

SPECIFICATION forming part of Letters Patent No. 531,358, dated December 25, 1894.

Application filed January 2, 1894. Serial No. 495,399. (No model.)

*To all whom it may concern:*

Be it known that we, LEWIS CALVIN BOSLEY and BENJAMIN BOSLEY, citizens of the United States, residing at Spickard, in the county of Grundy and State of Missouri, have invented a new and useful Pruning-Knife, of which the following is a specification.

This invention relates to pruning-implements, the objects in view being to produce a very simple, cheaply constructed, and durable device designed to be inserted among shrubbery and over branches of trees, and to be operated by drawing down upon the same, whereby said branches or shrubbery may be severed or pruned; to provide for an automatic return of the knife after each cut; to provide for a take-up for the spring which accomplishes this return and for an adjustment of the stroke of the knife.

With these and other objects in view the invention consists in certain features of construction hereinafter specified, and particularly pointed out in the claim.

Figure 1:
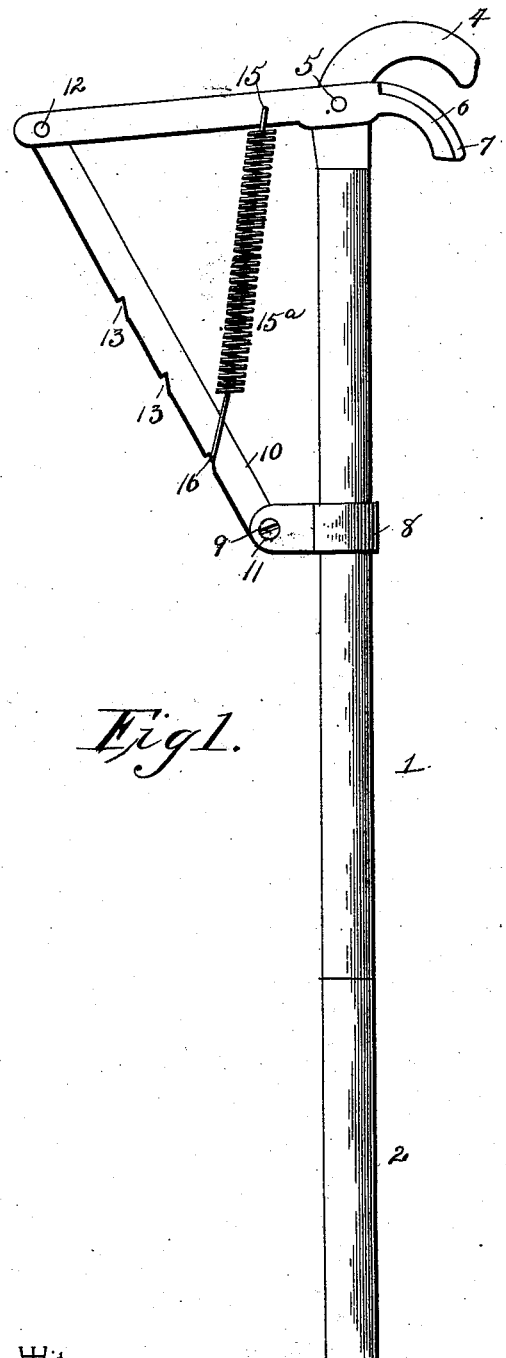
Figure 2:
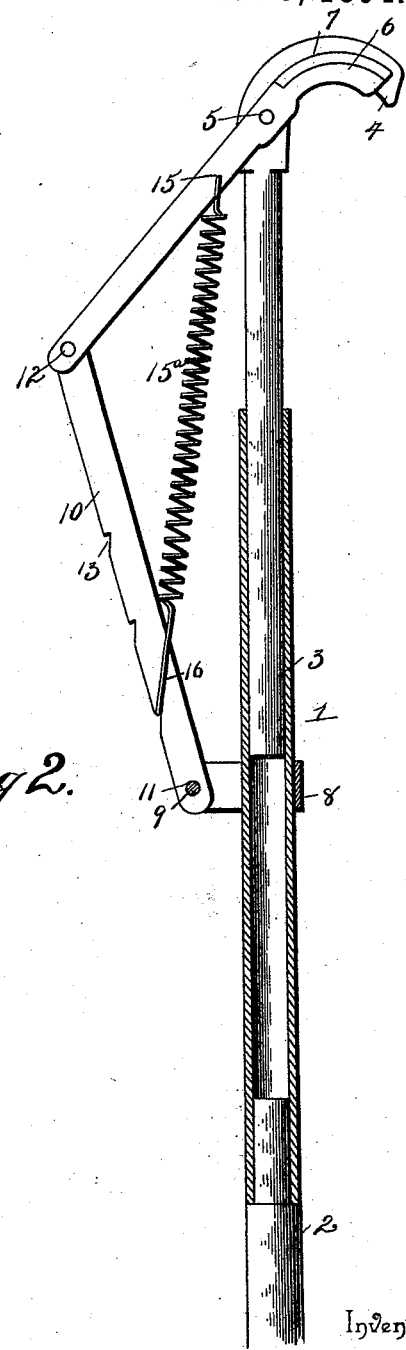

Referring to the drawings:—Figure 1 is a side-elevation of a pruning-implement constructed in accordance with this invention, the same being in its normal position. Fig. 2 is a sectional view, the parts being in the position they occupy when the cut is made.

Like numerals of reference indicate like parts in both figures of the drawings.

In practicing the invention a tube 1 is employed, the same being secured at its lower end to a handle 2 of suitable length. Located in this tube is the shank 3 which is designed to move longitudinally in the tube and projects beyond the same, where it terminates above the tube in a hook 4 designed to engage around shrubbery, over branches, &c.

Pivoted at 5 to the shank immediately below the hook is the knife-lever 6, the same having one end curved and beveled to form a knife 7 designed to co-operate against the edge of the hook 4.

A clip or cuff 8 embraces the tube 1 at a point below the hook 4, and the same is adjustable upon the tube to arrange the knife for cutting large or small limbs through the medium of a binding-screw 9 passed through a perforation in the cuff and impinging at its inner end upon the tube.

A link 10 is pivoted at 11 at its lower end to the cuff or clip 8, and at its upper end, as at 12, to the outer end of the knife-lever 6. The back edge of the link 10 is provided with a series of notches 13, and the knife-lever is provided with a perforation 15 upon its under side. This perforation is engaged by the upper end of a coiled spring 15$^a$ which has its lower end shaped to form a loop 16 which removably engages with any one of the series of notches 13. As the spring grows weak its position is changed in the notches, and hence its durability increased.

This completes the construction, and the operation of the device is as follows: The hook 4 is engaged over the branch of a tree for instance, and the operator draws down upon the handle 2, which causes the shank 3 to move within the tube or rather the tube to move downward upon the shank and the distance between the clip 8 and the point of pivot 5 in the knife-lever is increased. This causes the knife-lever, through the medium of the link 10, to move upon its fulcrum and brings its edge 7 against the under side of the hook, whereby the hook acting as a rest the knife passes through and severs the limb.

It will be seen that the device may be readily handled with one hand, is of cheap and simple construction, and comprises few parts.

Having described the invention, what is claimed is—

In a pruning implement, the combination of a handle-supported tube, a reciprocating shank mounted to slide within said tube and provided at its upper outer end with a curved hook portion, a knife-lever pivoted intermediate of its ends at one side of the reciprocating shank adjacent to the hook and provided near its point of pivot with a curved knife portion, a clip or cuff adjustably clamped on said tube, a movable link pivotally connected at one end to said clip or cuff and at its other end to one extremity of said knife lever, said link being provided in its outer edge with a longitudinal series of catch notches, and an adjustable retractile spring arranged in the angle between the knife lever and said link, said spring being connected at one end to the knife lever at one side of its pivot and provided at its other end with a loop arranged to loosely embrace said link and adapted to adjustably engage the notches thereof, substantially as set forth.

In testimony that we claim the foregoing as our own we have hereto affixed our signatures in the presence of two witnesses.

LEWIS CALVIN BOSLEY.
    BENJAMIN BOSLEY.

Witnesses:
    D. G. DENNIS,
    J. A. LOGAN.